(12) United States Patent
Colman et al.

(10) Patent No.: US 7,701,973 B2
(45) Date of Patent: Apr. 20, 2010

(54) PROCESSING RECEIVE PROTOCOL DATA UNITS

(75) Inventors: Nicholas A. Colman, Hillsboro, OR (US); Ramesh S. Krishnan, Hillsboro, OR (US); Anshuman Thakur, Beaverton, OR (US); Robert Cone, Portland, OR (US); Daniel A. Manseau, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1685 days.

(21) Appl. No.: 10/879,770

(22) Filed: Jun. 28, 2004

(65) Prior Publication Data

US 2005/0286560 A1 Dec. 29, 2005

(51) Int. Cl.
*H04J 3/16* (2006.01)

(52) U.S. Cl. ............ 370/471; 370/474; 370/476

(58) Field of Classification Search .............. None
See application file for complete search history.

(56) References Cited

U.S. PATENT DOCUMENTS

| | | | |
|---|---|---|---|
| 6,122,670 A * | 9/2000 | Bennett et al. | 709/236 |
| 6,675,200 B1 | 1/2004 | Cheriton et al. | |
| 6,742,016 B1 * | 5/2004 | Bhoj et al. | 709/207 |
| 6,882,654 B1 * | 4/2005 | Nelson | 370/401 |
| 6,895,544 B1 * | 5/2005 | Park et al. | 714/776 |
| 6,993,027 B1 * | 1/2006 | Kadambi et al. | 370/394 |
| 7,042,898 B2 * | 5/2006 | Blightman et al. | 370/463 |
| 7,209,962 B2 * | 4/2007 | Boden | 709/223 |
| 7,269,171 B2 * | 9/2007 | Poon et al. | 370/392 |
| 7,483,374 B2 * | 1/2009 | Nilakantan et al. | 370/235 |
| 2002/0118703 A1 * | 8/2002 | O'Neill et al. | 370/474 |
| 2004/0093411 A1 | 5/2004 | Elzur et al. | |

FOREIGN PATENT DOCUMENTS

WO 03/084078 10/2003

OTHER PUBLICATIONS

Culley, P., U. Elzur, R. Recio, S. Bailey, & J. Carrier, "Marker PDU Aligned Framing for TCP Specification", *Internet Draft (draft-ietf-rddp-mpa-00.txt)*, Oct. 7, 2003, pp. 1-58.

Deyring, K. (Tech. Ed.), "Serial ATA: High Speed Serialized AT Attachment", Revision 1.0a, Jan. 7, 2003, pp. 1-310.

IEEE Computer Society, IEEE Standard 802.3', Mar. 8, 2002, pp. 1-32.

Information Sciences Institute, "Internet Protocol", *DARPA Internet Program Protocol Specification*, RFC: 791, Sep. 1981, pp. 1-45.

Information Sciences Institute, "Transmission Control Protocol", *DARPA Internet Program Protocol Specification*, RFC: 793, Sep. 1981, pp. 1-85.

(Continued)

*Primary Examiner*—Gregory B Sefcheck
(74) *Attorney, Agent, or Firm*—Konrad Raynes & Victor LLP; Janaki K. Davda

(57) ABSTRACT

Provided are techniques for processing a data segment by stripping a header from a transport layer segment, performing protocol data unit detection to determine data for a protocol segment that is part of the transport layer segment data, and performing marker validation and stripping.

15 Claims, 15 Drawing Sheets

OTHER PUBLICATIONS

Krueger, M., R. Haagens, C. Sapuntzakis, & M. Baake, "Small Computer Systems Interface Protocol Over the Internet (iSCSI) Requirements and Design Considerations", *RFC: 3347*, Jul. 2002, pp. 1-26.

PCT International Search Report and Written Opinion for International Application No. PCT/US2005/020551, dated Oct. 20, 2005.

Penokie, G.O. (Tech. Ed.), "Information Technology—SCSI Controller Commands—2 (SCC-2)", *X3T10/1225D*, Revision 4, Sep. 12, 1997, pp. i-xvi & 1-8.

RDMA Consortium, "Architectural Specifications for RDMA over TCP/IP", [online], 2005, [Retrieved on Dec. 22, 2005], retrieved from the Internet at <URL: http://www.rdmaconsortium.org/home>.

Shanley, T. & D. Anderson, *PCI System Architecture*, Fouth Edition, Aug. 2001, Addison-Wesley, Boston, pp. i-xliii & 1-21.

Snively, R. (Tech. Ed.), "Information Systems—dpANS Fibre Channel Protocol for SCSI", *X3.269-199X*, Revision 012, Dec. 4, 1995, pp. i-x & 1-63.

PCT International Preliminary Examination Report (IPRP), Jan. 11, 2007, for International Application No. PCT/US2005/020551.

Office Action 1, Feb. 4, 2009, for German Application No. DE112005001364, 6 pp. [Translation Attached].

Office Action 1 (in Chinese with English translation), Nov. 13, 2009, for Patent Application No. CN200580017333.4, 8 pp.

\* cited by examiner

1300   BEFORE ONE-BEHIND CACHE

1400   AFTER ONE-BEHIND CACHE

PROCESSING RECEIVE PROTOCOL DATA UNITS

BACKGROUND

Description of the Related Art

Open System Interconnection (OSI) is an International Standards Organization (ISO) standard that defines a networking framework for implementing protocols in seven layers. The seven layers are: application, presentation, session, transport, network, data link, and physical layer. The physical layer connects to a physical link. When data is being transmitted, the data is transferred from the application layer, via the presentation layer, session layer, transport layer, network layer, data link layer, and physical layer, to the physical link. When data is being received from the physical link, the data passes through the physical layer, the data link layer, network layer, transport layer, session layer, presentation layer, to the application layer. Thus, control is passed from one layer to the next to transmit and receive data.

The application layer (Layer 7) supports application and end-user processes. The presentation layer (Layer 6) translates data from application to network format, and vice versa. The session layer (Layer 5) establishes, manages and terminates connections between applications. The transport layer (Layer 4) provides transfer of data. The network layer (Layer 3) provides switching and routing. The data link layer (Layer 2) encodes and decodes data packets into bits. The physical layer (Layer 1) conveys a bit stream through a physical network.

Usage of networking protocols, such as OSI, in storage and inter-process communication is becoming prevalent. This convergence provides immense cost-advantages for Information Technology (IT) infrastructure by eliminating a need for a separate physical medium for carrying storage traffic. This advantage comes at a cost to the end stations, which have to run more complex protocols on the host processors.

Thus, there is a need in the art for improved protocol processing.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
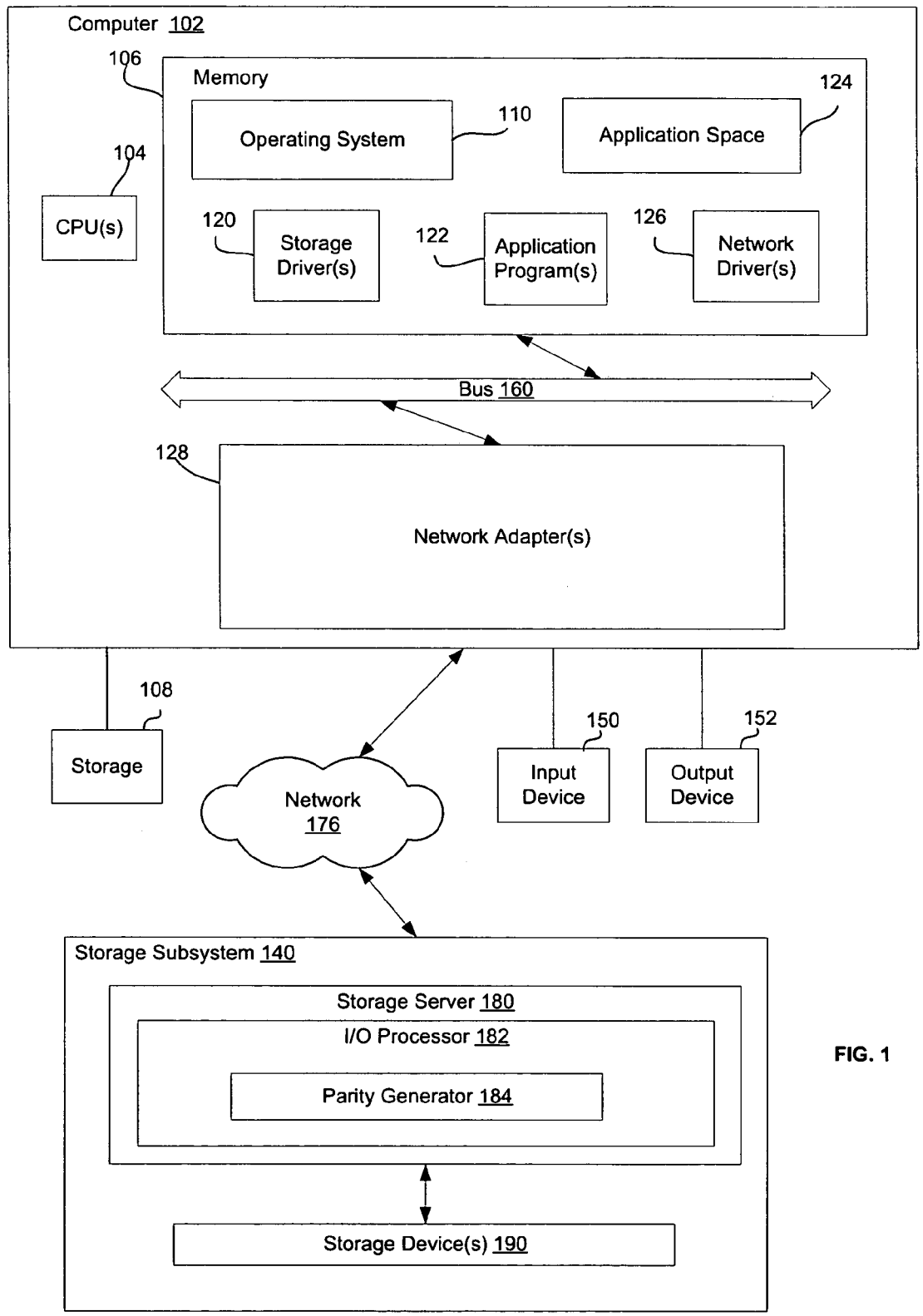
FIG. 1 illustrates details of a computing environment in which certain embodiments may be implemented.

FIG. 1 illustrates details of a computing environment in which certain embodiments may be implemented. A host computer 102 includes one or more central processing units (CPUs) 104, a volatile memory 106, non-volatile storage 108 (e.g., magnetic disk drives, optical disk drives, a tape drive, etc.), an operating system 110, and one or more network adapters 128. One or more storage drivers 120, one or more application programs 122, and one or more network drivers 126 reside in memory 106 for execution by CPUs 104 and are capable of transmitting and retrieving packets from remote storage subsystem 140 over a network 176. Additionally, a portion of memory is designated as application space 124, which is accessible by the application programs 122.

The host computer 102 may comprise any computing device known in the art, such as a mainframe, server, personal computer, workstation, laptop, handheld computer, telephony device, network appliance, virtualization device, storage controller, etc. Any CPU 104 and operating system 110 known in the art may be used. Programs and data in memory 106 may be swapped into storage 108 as part of memory management operations. The network 176 may comprise any type of network, such as, for example, a Storage Area Network (SAN), a Local Area Network (LAN), Wide Area Network (WAN), the Internet, an Intranet, etc.

The storage subsystem 140 includes a storage server 180 (i.e., a type of computing device) connected to one or more storage devices 190. The storage devices 190 may each comprise a storage device or an array of storage devices, such as Direct Access Storage Devices (DASDs), Just a Bunch of Disks (JBOD), Redundant Array of Independent Disks (RAID), virtualization device, etc. The storage server 180 includes an I/O processor 182, which includes a parity generator 184. The parity generator 184 is capable of generating parity information in accordance with embodiments.

Each network adapter 128 includes various components implemented in the hardware of the network adapter 128. Each network adapter 128 is capable of transmitting and receiving packets of data over network 176.

Each network driver 126 includes network adapter 128 specific commands to communicate with each network adapter 128 and interface between the operating system 110, each storage driver 120, and each network adapter 128. Each network adapter 128 or network driver 126 implements logic to process the packets, such as a transport protocol layer to process the content of messages included in the packets that are wrapped in a communication protocol, such as Transmission Control Protocol (TCP) (IETF RFC 793, published September 1981) and/or Internet Protocol (IP) (IETF RFC 791, published September 1981), the Internet Small Computer System Interface (iSCSI) (IETF RFC 3347, published February 2003), Fibre Channel (American National Standards Institute (ANSI) X3.269-199X, Revision 012, Dec. 4, 1995), or any other communication protocol known in the art. The transport protocol layer unpacks a payload from the received Transmission Control Protocol/Internet Protocol (TCP/IP) packet and transfers the data to a network driver 126 to return to an application program 122. Further, an application program 122 transmitting data transmits the data to a network driver 126, which then sends the data to the transport protocol layer to package in a TCP/IP packet before transmitting over the network 176.

The storage 108 may comprise an internal storage device or an attached or network accessible storage. Programs in the storage 108 may be loaded into the memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc.

Various structures and/or buffers (not shown) may reside in memory 106 or may be located in a storage unit separate from the memory 106 in certain embodiments.

Figure 2:
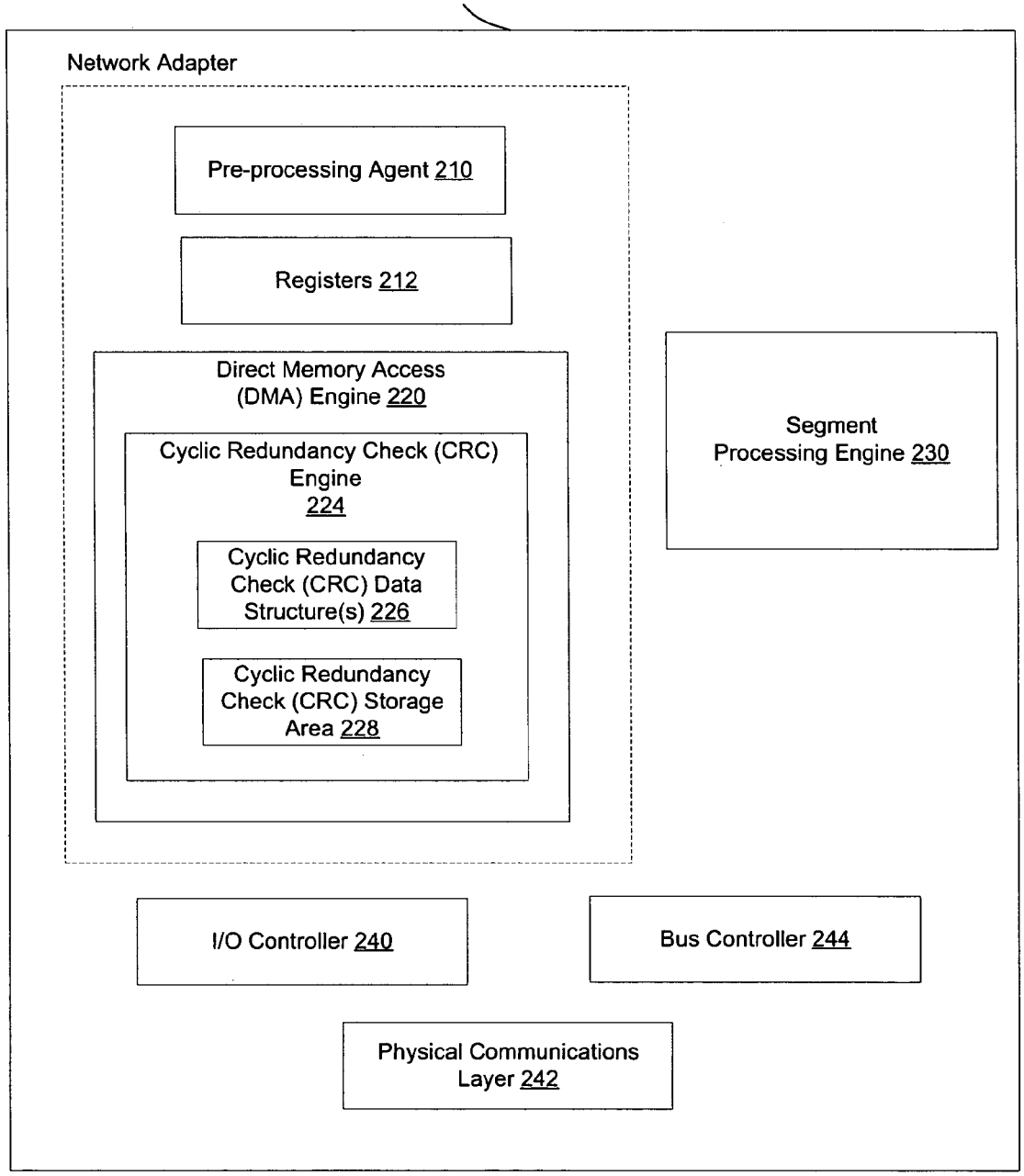
FIG. 2 illustrates a block diagram of a network adapter in accordance with certain embodiments.

FIG. 2 illustrates a block diagram of a network adapter 128 in accordance with certain embodiments. The network adapter includes a pre-processing agent 210 that uses registers 212, a Direct Memory Access (DMA) engine 220 that includes a Cyclic Redundancy Check (CRC) engine 224, a segment processing engine 230, an Input/Output (I/O) processor 240, a physical communications layer 242, and a bus controller 244. The CRC engine 224 includes one or more Cyclic Redundancy Check (CRC) data structures 226 and a Cyclic Redundancy Check (CRC) storage area 228. In certain embodiments, the pre-processing agent 210 pre-processes data segments conforming to Layer 4+ protocols, which will be referred to as protocol segments for ease of reference. For ease of reference, the term "Layer 4+ protocols" will be used herein to describe emerging protocols, such as iSCSI and RDMA (RDMA Consortium, RDMA Protocol Over TCP/IP Networks, Version 1.0, October 2002). Although iSCSI and RDMA protocols may be described as higher level protocols (e.g., Layer 5 or higher level protocols), embodiments refer to the iSCSI and RDMA protocols as Layer 4+ protocols because they are closely tied to the processing of Layer 4 protocols. Certain of the protocols (e.g., RDMA) may be tied with the transport layer (i.e., Layer 4) protocol (e.g., TCP). In certain embodiments, the segment processing engine 230 processes data segments (e.g., TCP segments), which will be referred to as "transport layer segments" for ease of reference. A protocol data unit may be described as a unit of transfer for the Layer 4+ protocols. A protocol segment may be described as a portion or all of a protocol data unit (i.e., a protocol data unit may form one or more protocol segments).

In certain embodiments, the preprocessing agent 210 may be described as a dedicated processor that has a context sensitive register space (registers 212) and may be used in conjunction with the segment processing engine 230 to achieve effective and programmable receive processing.

A bus controller 244 enables each network adapter 128 to communicate on a computer bus 160, which may comprise any bus interface known in the art, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc.

The network adapter 128 includes a network protocol for implementing a physical communication layer 242 to send and receive network packets to and from remote data storages over a network 176. In certain embodiments, the network adapter 128 may implement the Ethernet protocol (IEEE std. 802.3, published Mar. 8, 2002), Fibre Channel protocol (American National Standards Institute (ANSI) X3.269-199X, Revision 012, Dec. 4, 1995) or any other network communication protocol known in the art.

The network adapter 128 includes an Input/Output (I/O) controller 240. In certain embodiments, the I/O controller 240 may comprise Internet Small Computer System Interface (iSCSI controllers), and it is understood that other types of network controllers, such as an Ethernet Media Access Controller (MAC), or cards may be used.

To relieve the burden of running more complex protocols on host processors, certain embodiments offload protocol processing, as well as data placement, from the host processor. In certain embodiments, the offload protocol processing may be provided with dedicated hardware. In certain embodiments, the network adapter 128 may implement a transport layer offload engine (TOE) to implement the transport protocol layer in the network adapter to reduce host computer processing burdens. Offloading of protocol processing leads to effective processing and placement of received data. Embodiments provide receive path processing. In certain embodiments, the receive path processing is for Layer 4+ (iSCSI, RDMA) protocol data units.

Embodiments improve Layer 4+ Protocol Data Unit (PDU) detection, marker validation and stripping, Layer 4+ header processing (including those headers split across Layer 4 boundaries), direct data transfer into application space, and Cyclic Redundancy Check (CRC) digest calculation.

Cyclic redundancy check may be described as a technique for detecting data transmission errors. For example, with a cyclic redundancy check technique, a message may be divided into predetermined lengths that are divided by a fixed divisor, and the remainder number is appended to the message. When the message is received with the appended remainder, the receiving computing device recalculates the remainder and compares the recomputed remainder to the appended remainder. If the remainders do not match, an error is detected.

Figure 3:
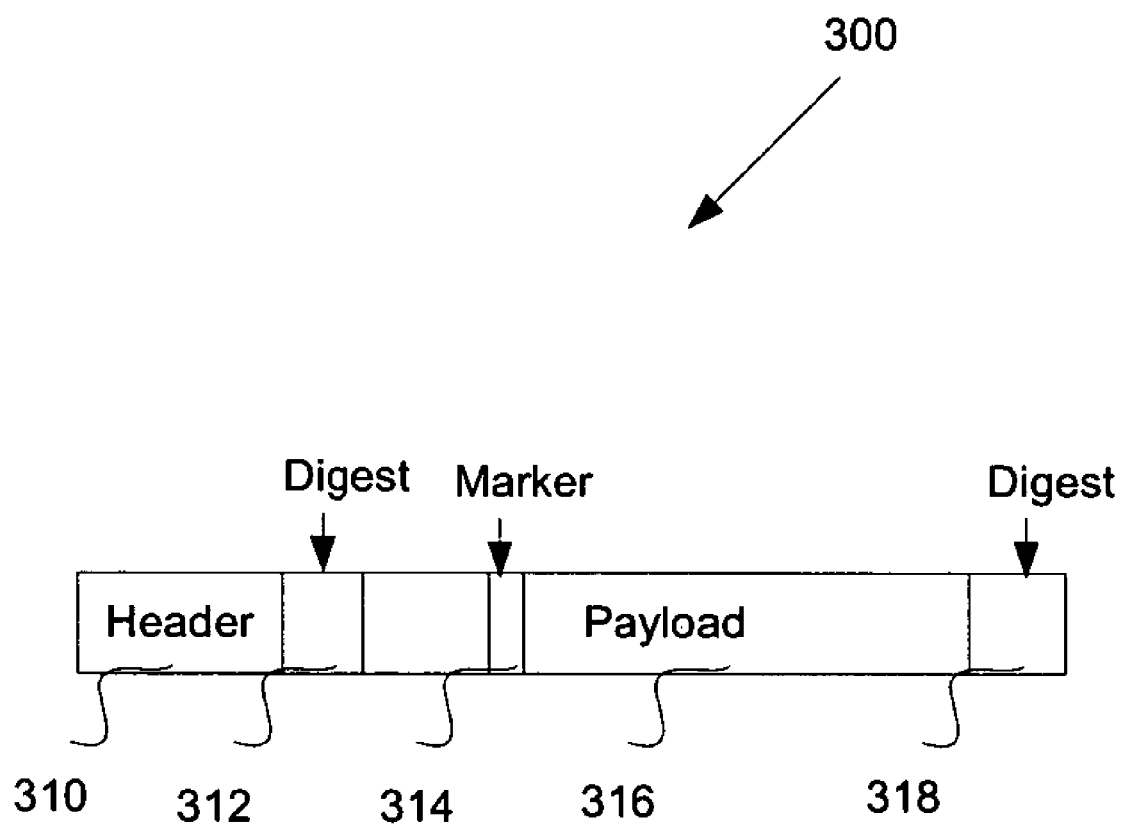
FIG. 3 illustrates a block diagram of a protocol data unit in accordance with certain embodiments.

FIG. 3 illustrates a block diagram of a protocol data unit 300 in accordance with certain embodiments. The protocol data unit 300 includes several fields, such as a header 310, one or two digests 312, 318, a marker 314, and a payload 316. The header 310 includes the length of the entire protocol data unit, along with other information. The digest 312, 318 may be derived using a cyclic redundancy check (e.g., a CRC-32C technique) over the data covered. The iSCSI protocol has two digests, one for the header and one for the payload. The RDMA protocol has a single digest for the entire protocol data unit. The marker 314 is a field that is present in a TCP stream. Each marker 314 is a pointer to the start or the end of the protocol data unit or both. The payload 316 is data.

Figure 4:
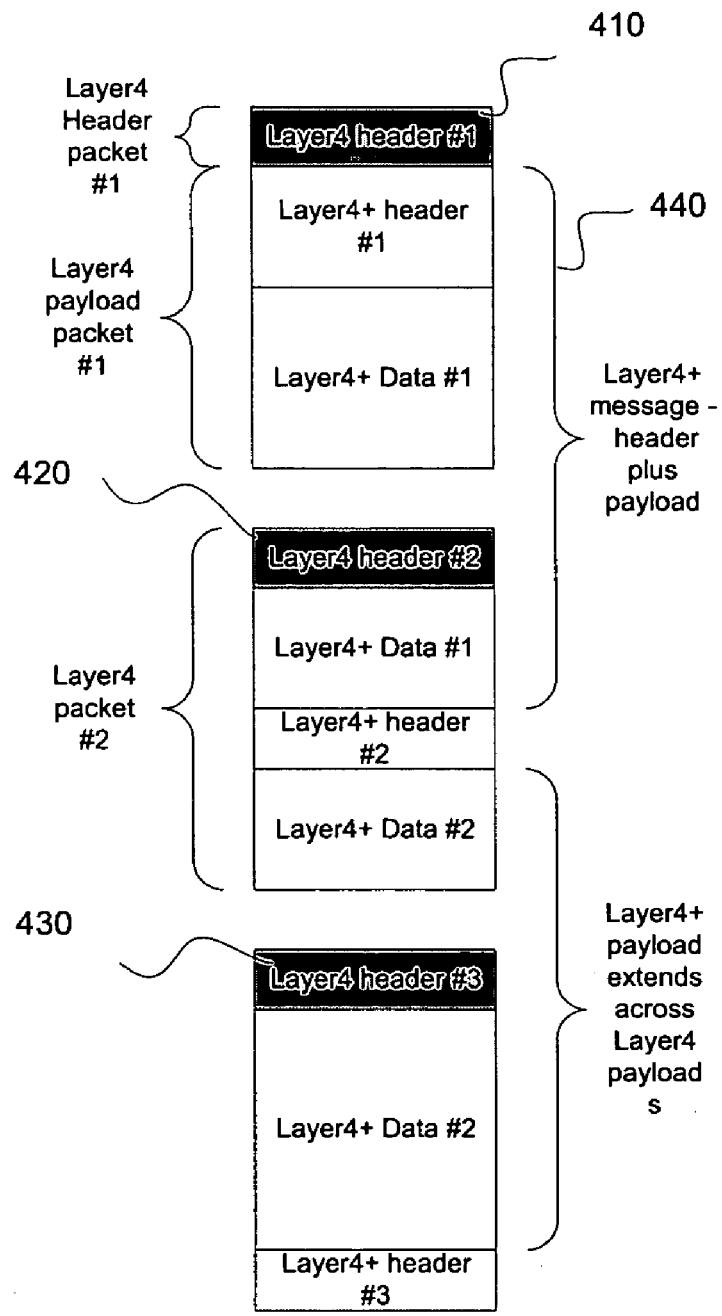
FIG. 4 illustrates three Transmission Control Protocol (TCP) segments in accordance with certain embodiments.

Layer 4+ protocol data units are first constructed and then handed over for TCP processing as a byte stream. The TCP processing may re-segment each protocol segment into multiple transport layer segments so that each transport layer segment that is sent out does not exceed an effective maximum data segment size. FIG. 4 illustrates three transport layer segments 410, 420, 430 in accordance with certain embodiments. Each transport layer segment 410, 420, 430 includes a Layer 4 header #1, #2, #3, respectively. Also, a transport layer segment (e.g., 410) payload may include Layer 4+ header and data.

In some cases, a protocol data unit for a Layer 4+ protocol is not fully contained in a transport layer segment. For example, a single protocol data unit #1 440 has a header portion and two data portions, with transport layer segment 410 including the Layer 4+ header #1 and Layer 4+ data #1 (i.e., a portion of data for protocol data unit #1) and transport layer segment 420 including Layer 4+ data #1 (i.e., additional data for protocol unit #1). Thus, a protocol data unit may be contained in a single transport layer segment, a protocol data unit may be segmented across transport layer segments, a transport layer segment may contain multiple protocol data units or a combination of these.

Figure 5:
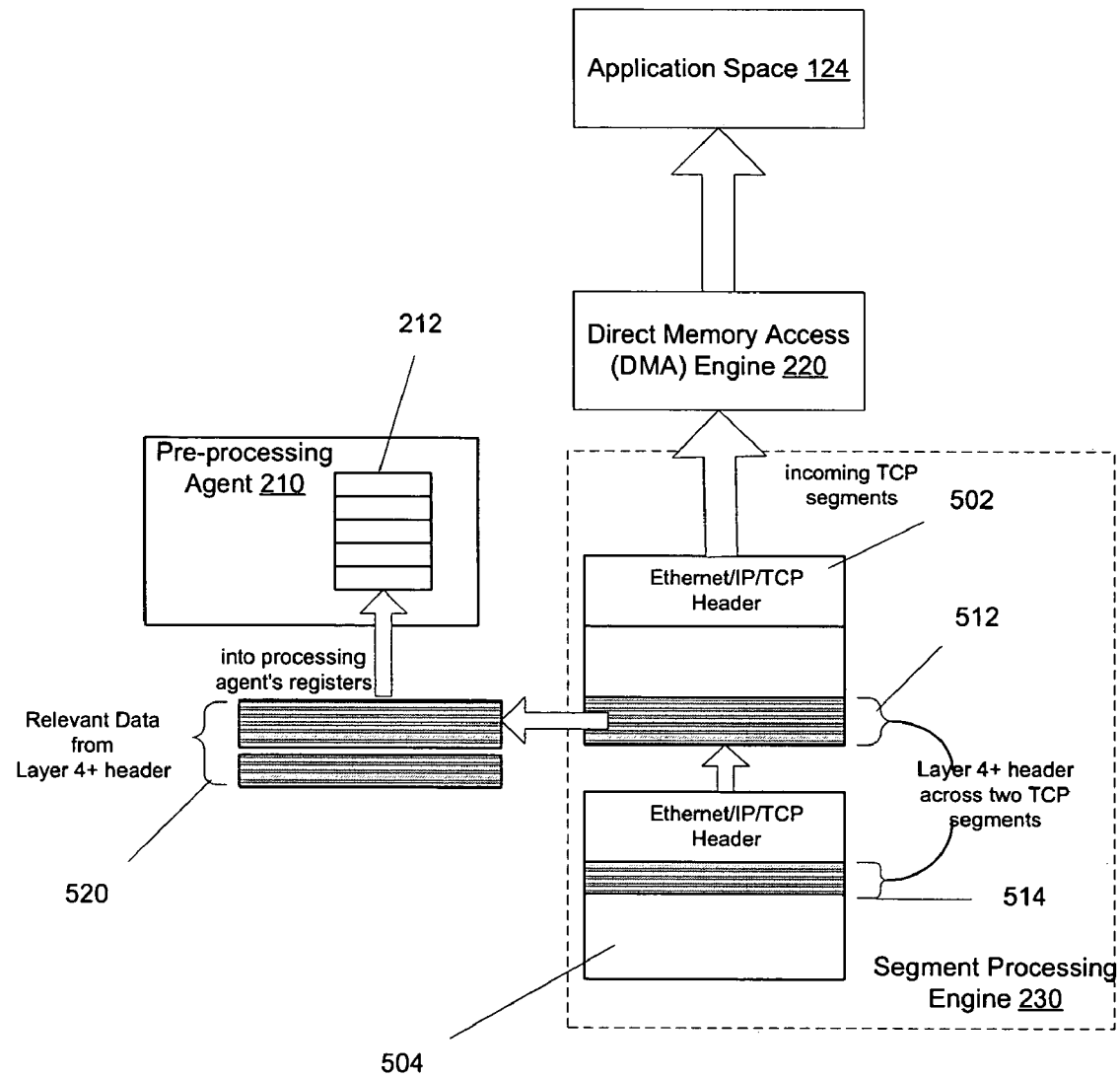
FIG. 5 illustrates Transmission Control Protocol (TCP) segment and protocol data unit processing in accordance with certain embodiments.

FIG. 5 illustrates transport layer segment and protocol data unit processing in accordance with certain embodiments. As transport layer segments 502, 504 arrive and protocol data units for Layer 4+ are detected by the segment processing engine 230, a copy of N bytes of relevant data from a Layer 4+ header 520 is directly placed into the register space 212 of the pre-processing agent 210 and the context is loaded. Context may be described as information related to a particular TCP connection. In certain embodiments, one TCP connection has one context. In certain other embodiments, one TCP connection may have one or more contexts. In this example, the relevant data from the Layer 4+ header 520 includes two portions 512 and 514 that were located in two transport layer segments 512, 514. In line processing of Layer 4+ header bytes reduces the processing latency by eliminating the store and forward architectural paradigm used in conventional systems. Additionally, incoming data may be retrieved by the Direct Memory Access (DMA) engine 220 for placement into the application space 124 upon the pre-processing agent 210 issuing a command to the DMA engine 220.

Figure 6:
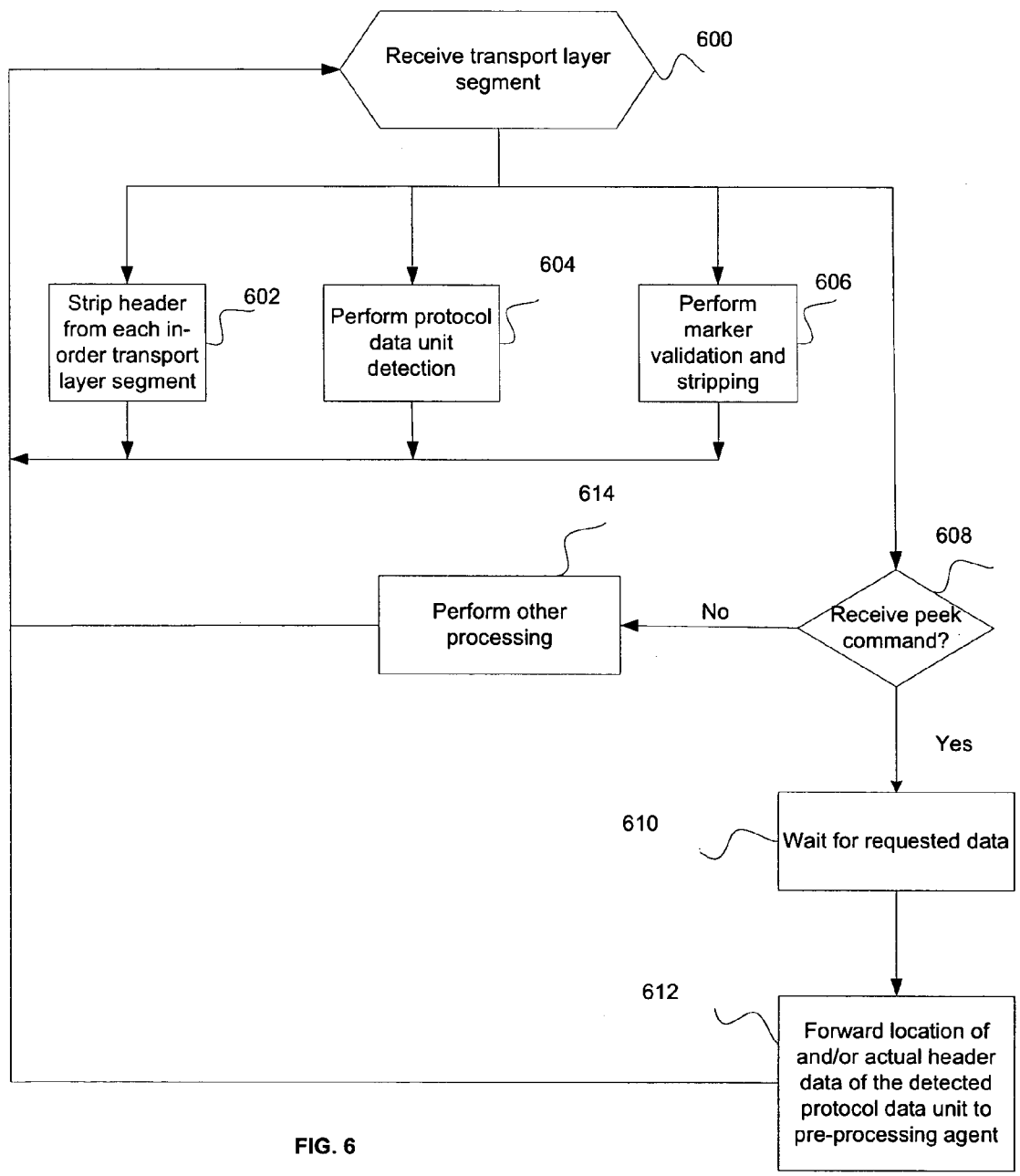
FIG. 6 illustrates operations performed by a segment processing engine in accordance with certain embodiments.

FIG. 6 illustrates operations performed by the segment processing engine 230 in accordance with certain embodiments. Control begins at block 600 with the segment processing engine 230 receiving a transport layer segment. In certain embodiments, the segment processing engine 230 strips a header from an in-order transport layer segment (block 602), performs protocol data unit detection (block 604), performs marker validation and stripping (block 606), and processes a peek command if one is received (blocks 608-614) in parallel. In certain alternative embodiments, the processing of blocks 602, 604, 606, and 608 may be performed serially or with some processing being performed in parallel while other processing is performed serially. The processing of block 602 is performed for the processing of blocks 604 and 606 in certain embodiments. Also, in certain embodiments, if a transport layer segment is received out of order, embodiments will wait for the missing transport layer segments and place the transport layer segments in order before processing them.

In block 604, protocol data unit detection identifies a location of a Layer 4+ header. From blocks 602, 604, and 606, processing loops back to block 600.

In block 608, the segment processing engine 230 determines whether a peek command has been received. If so, processing continues to block 610, otherwise, processing continues to block 614. A peek command is a command requesting that the segment processing engine 230 "look ahead" into incoming transport layer segments and locate particular data. In block 610, the segment processing engine 230 waits for the requested data. Once the requested data is received, processing continues from block 610 to block 612. In block 612, the segment processing engine 230 forwards an indication of the location of a Layer 4+ header and/or forwards the actual Layer 4+ header of the detected protocol data unit to the pre-processing agent 210. In certain embodiments, the indication of the location is provided by sending pointers to a starting location and an ending location of the protocol data unit. From block 612, processing loops back to block 600. In block 614, other processing may be performed before looping back to block 600. Although the segment processing engine 230 is illustrated as checking for a peek command in block 608, other processing may occur prior to the processing of block 608. The other processing may include processing additional incoming transport layer segments.

For receive protocol data units, embodiments provide a configurable Marker Processing Agent (MPA) and protocol data unit detection; direct peek of data for pre-processing agent 210 registers 212; data placement into application space 124 (i.e., placement of data into memory for access by an application rather than into a general memory area from which the data is moved into the memory accessed by the application); and cyclic redundancy check (e.g., CRC-32C technique) validation.

In certain embodiments, the Marker Processing Agent (MPA) may be part of segment processing engine 230. As for the configurable MPA and protocol data unit detection, embodiments provide a configuration mechanism for each TCP connection that enables marker stripping/validation and protocol data unit detection. In particular, a computer has different connections with different computers (e.g., a browser at a first computer connected to an email account at a second computer has a connection with that second computer). In certain embodiments, the TCP connection may be set up for the duration of data being transmitted.

Embodiments set the following new parameters for each Layer 4+ TCP connection:
  (a) Offset of length field in Layer 4+ header (also referred to as "O")
  (b) Width of length field in Layer 4+ header (also referred to as "W")
  (c) Length field multiplier (also referred to as "M")
  (d) Length field adder (also referred to as "A")
  (e) Order of multiply/add (also referred to as "D")
  (f) Marker interval (also referred to as "I")
  (g) Initial offset (also referred to as "S")
  (h) Marker length (also referred to as "L")
  (i) Marker type (also referred to as "T")

Among the new TCP connection parameters, the length field multiplier parameter (M) and the length field adder parameter (A) are negotiated at the time of a Layer 4+ connection. The order of multiply/add parameter (D) is a constant for a given TCP connection that is negotiated by the two computing devices for which the connection was created, and this parameter determines how to calculate a final length of data for a protocol data unit as this information is not provided by the Layer 4+ protocol.

The new TCP connection parameters may be set as soon as a connection is created and before any data is transferred. These fields are used with in-order transport layer segments to detect protocol data unit boundaries, validate markers, and delete (strip) markers.

Figure 7:
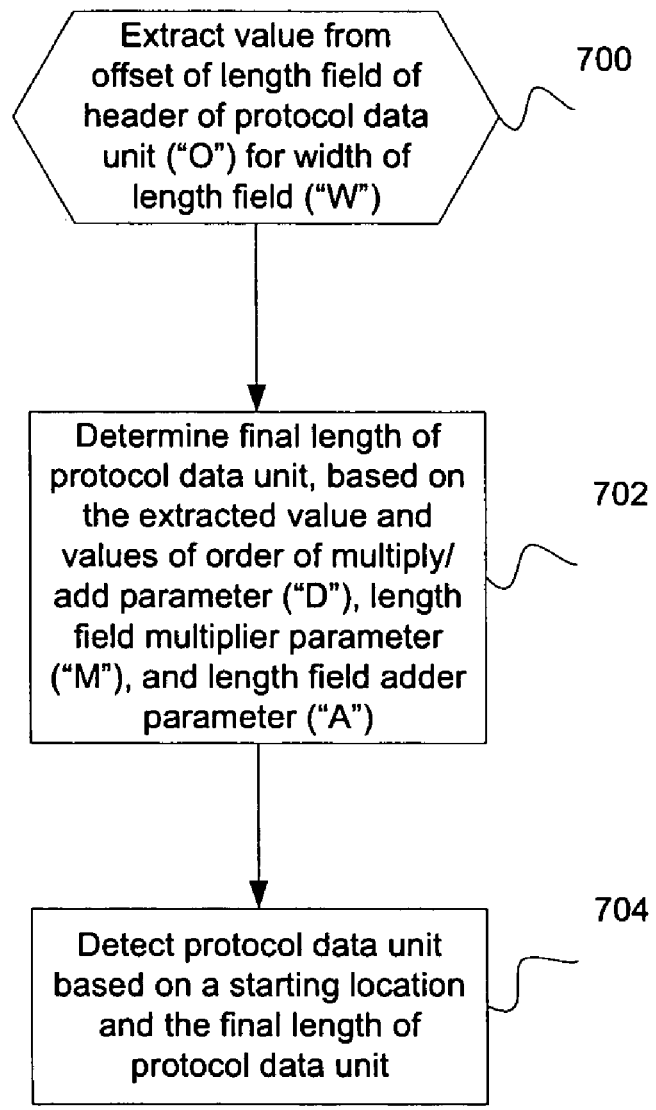
FIG. 7 illustrates operations performed by a segment processing engine for protocol data unit detection in accordance with certain embodiments.

FIG. 7 illustrates operations performed by the segment processing engine 230 for protocol data unit detection (block 604) in accordance with certain embodiments. Control begins at block 700 with the segment processing engine 230 extracting a value from an offset of the length field in the header of a protocol data unit (parameter "O") for the width of the length field in the header (parameter "W"). For example, if the length field starts at an offset of four bytes and has a width of five bytes, then the value is extracted from bytes four, five, six, seven, and eight. In block 702, the segment processing engine 230 determines a final length of a protocol data unit based on the extracted value (from block 700) and the values of an order of multiply/add parameter ("D"), a length field multiplier parameter ("M"), and a length field adder parameter ("A").

In certain embodiments, the segment processing engine 230 uses the following pseudocode for determining the final length, where the (Value at [O . . . O+W]) is the extracted value from the processing of block 700:

```
If (D==0) begin
    final_length = ((Value at [O..O+W]) × M) + A
else
    final_length = ((Value at [O..O+W]) + A) × M
```

That is, if the value of the order of multiply/add parameter ("D") is zero, then the final length is determined by taking the value starting at the value of the offset of the length field in the Layer 4+ header parameter ("O") through the value of the offset parameter ("O") plus the value of the width of the length field in the Layer 4+ header parameter ("W"). This value is multiplied by the value of the length field multiplier ("M"), and then the result is added to the value of the length field adder parameter ("A").

On the other hand, if the value of the order of multiply/add parameter ("D") is not zero, then the final length is determined by taking the value starting at the value of the offset of the length field in the Layer 4+ header parameter ("O") through the value of the offset parameter ("O") plus the value of the width of the length field in the Layer 4+ header parameter ("W"). This value is added to the value of the length field adder ("A"), and then the result is multiplied by the value of the length field multiplier ("M").

In block 704, the segment processing engine 230 detects the protocol data unit based on a starting location and a final length of the protocol data unit. In certain embodiments, the protocol data unit is detected from a starting location ("Start") to the starting location plus the determined final length ("Start"+final_length). In certain embodiments, "Start" may be described as the start of the data of a protocol data unit.

Figure 8:
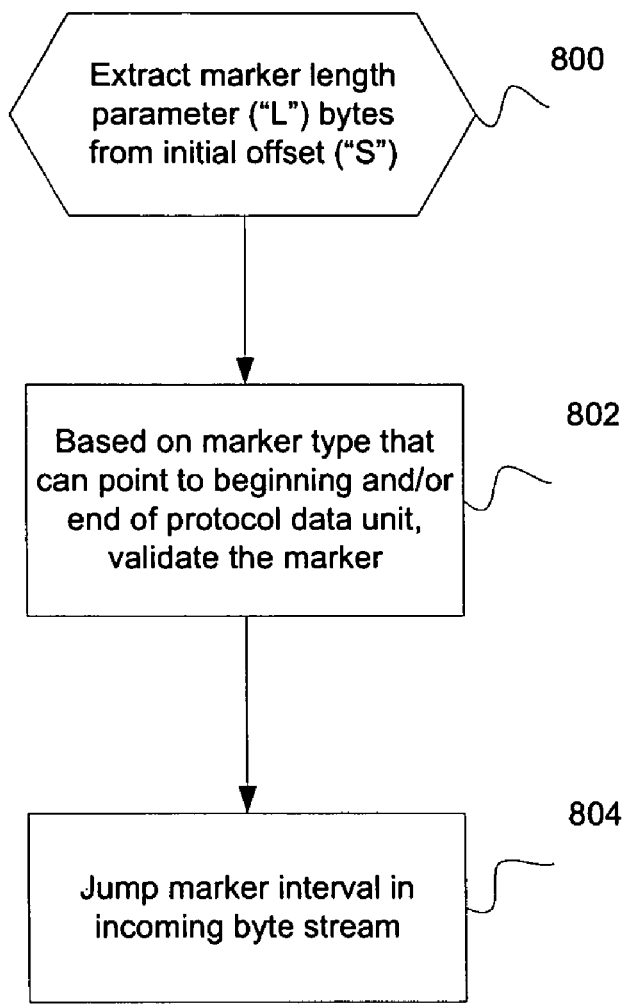
FIG. 8 illustrates operations performed by a segment processing engine for marker validation and stripping in accordance with certain embodiments.

FIG. 8 illustrates operations performed by the segment processing engine 230 for marker validation and stripping (block 606) in accordance with certain embodiments. Control begins at block 800 with the segment processing engine 230 extracting marker length parameter ("L") bytes from an initial offset. In certain embodiments, the initial offset is the start of a protocol segment or the start of a protocol data unit and may be designated as parameter "S", which is variable. In block 802, the segment processing engine 230 performs marker validation based on a marker type that can point to a beginning and/or end of a protocol data unit. In certain embodiments, the segment processing engine 230 validates the marker with the following psuedocode:

```
If (T==Beginning)
    Check whether marker points to the beginning found by
protocol data unit detection
    else if (T==Ending)
        Check whether end
    else if (T==Both)
        Split marker field into two portions and
        check whether one portion points to the beginning and the
        other portion points to the end
```

That is, for marker validation, the segment processing engine 230 determines whether the value of the marker type parameter ("T") is set to beginning. If so, the segment processing engine 230 checks whether the marker points to the beginning of a protocol data unit (i.e., the "Start" found by protocol data unit detection processing in FIG. 7). If the value of the marker type parameter ("T") is set to end, the segment processing engine 230 checks whether the marker points to the end of a protocol data unit. If the value of the marker type parameter ("T") is set to both, the segment processing engine 230 splits the marker field into two portions and checks whether one portion of the marker points to the beginning and the other portion of the marker points to the end.

Once the marker is validated, in block 804, the segment processing engine 230 jumps a marker interval in the incoming byte stream.

Figure 9:
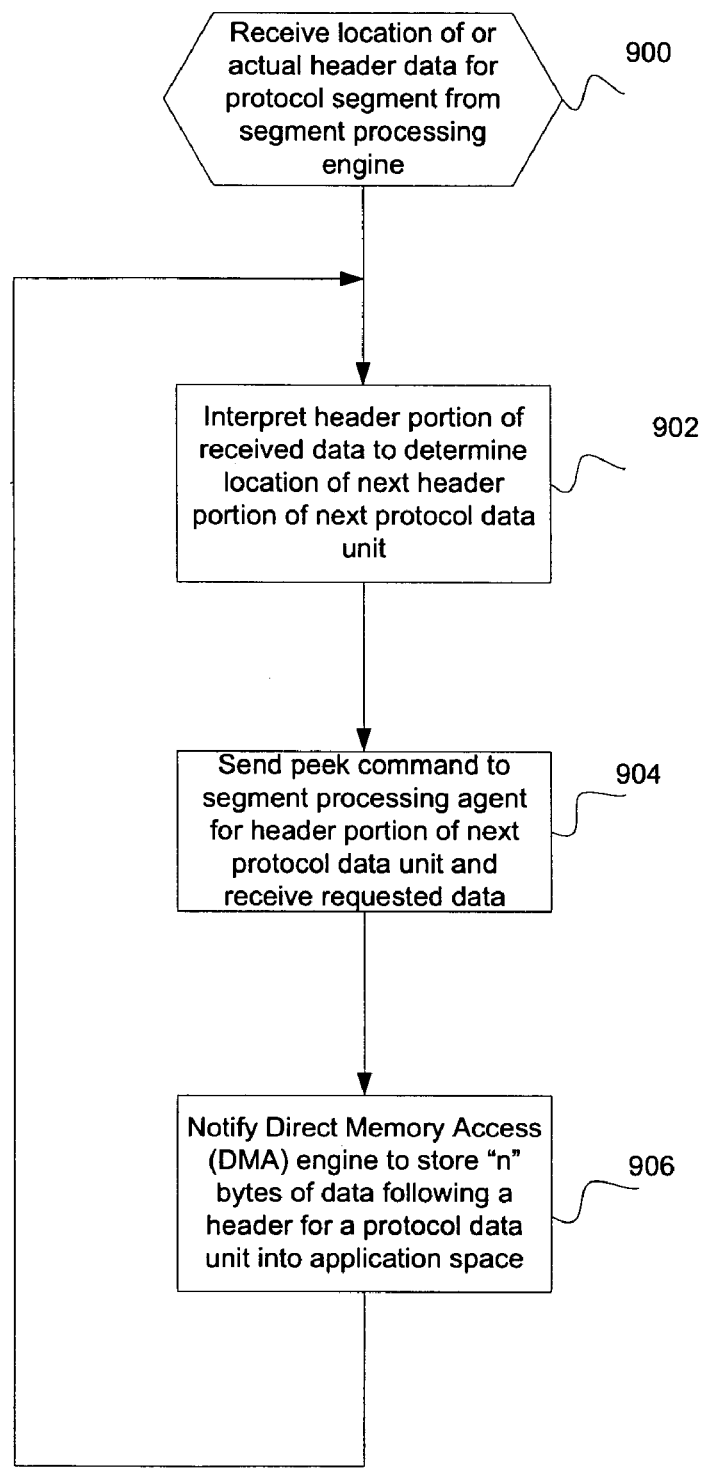
FIG. 9 illustrates operations performed by a pre-processing agent in accordance with certain embodiments.

FIG. 9 illustrates operations performed by the pre-processing agent 210 in accordance with certain embodiments. Receive processing of a layer 4+ protocol data unit includes inspecting a header and processing the header. In certain embodiments, the header processing is performed before the data of a previous message has been completely transferred to the host computer 102. Since these Layer 4+ protocols are used for application programs 122 such as disk access and inter-process communication, low processing latencies are desired. In certain embodiments, hard-coding header processing in silicon is avoided as it provides a less flexible solution for header processing.

Embodiments perform header processing in a flexible manner by utilizing a pre-processing agent 210 that has context sensitive register space 212 (e.g., a microengine).

Control begins at block 900 with the pre-processing agent 210 receiving an indication of the location of or actual header data for a protocol segment from the segment processing engine 230. In block 902, the pre-processing agent 210 interprets the header portion of the received data to determine a location of a next header portion of a next data portion for a protocol data unit. In block 904, the pre-processing agent 210 sends a peek command to the segment processing engine 230 for a header portion of the next protocol data unit and receives the requested data from the issued peek command. In certain embodiments, the received data is an indication of the location of a Layer 4+ header and/or the actual Layer 4+ header of a protocol data unit. Although the receipt of data from the issued peek command is illustrated as following issuance of the peek command, the receipt of data may occur at any time after the peek command is issued (e.g., after the processing of block 906). By use of the peek command, certain embodiments provide direct peek results into the pre-processing agent 210 registers 212.

Figure 10:
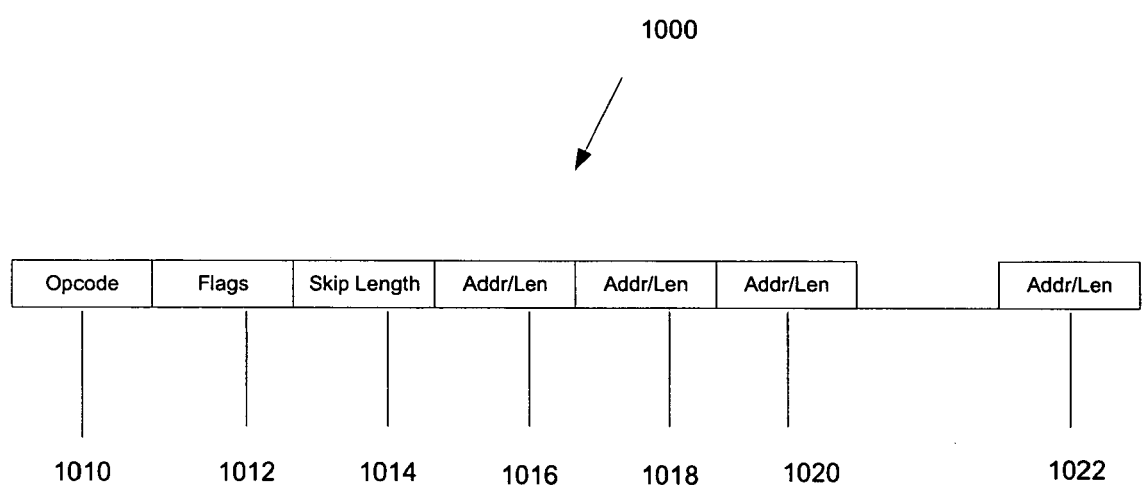
FIG. 10 illustrates a format of a Receive Buffer instruction in accordance with certain embodiments.

Certain embodiments also provide placement of received data into application space 124. In block 906, the pre-processing agent 210 notifies the Direct Memory Access (DMA) engine 220 to store "n" (where "n" represents a positive integer value) bytes of data for a protocol data unit into application space 124. In certain embodiments, the pre-processing agent 210 issues a Receive Buffer instruction to the DMA engine 220. FIG. 10 illustrates a format of a Receive Buffer instruction 1000 in accordance with certain embodiments. The Receive Buffer instruction 1000 includes an opcode 1010, flags 1012, a skip length 1014, and a list of address/length pairs 1016, 1018, 1020, . . . 1022. Although four address/length pairs are illustrated, any number may be included in the Receive Buffer instruction. The opcode 1010 provides an instruction type, which in this case is the "Receive Buffer" type of instruction.

The opcode 1010 is followed by flags 1012 that are relevant to the transfer of data to application space 124. Some of the flags that are provided with the instruction are: C for calculating a CRC digest over the transfer amount (e.g., with a CRC32-C technique) and P that represents strip pad bytes that are to be removed from the payload that is being transferred.

The flags 1012 are followed by a skip length 1014 that is to be skipped when transferring data. The skip length 1014 is useful in skipping Layer 4+ headers so that data is stored in the application space 124. The skip length 1014 is followed by a scatter list of address/length pairs 1016 . . . 1024. An address/length pair 1016 . . . 1024 provides an address in application space 124 and an associated length so that data may be stored at that address for the specified length.

Once the Receive Buffer instruction is scheduled with the DMA engine 220, the Receive Buffer instruction is applied to the incoming transport layer segments. The Receive Buffer instruction strips the TCP payload for a protocol data unit from a transport layer segment, completes the transfer of the payload to the destination application space 124, and updates the address/length parameters to reflect the current transfer. This process eliminates the requirement for temporary buffering of in-order transport layer segments.

Embodiments calculate a cyclic redundancy check (e.g., CRC-32C) digest while the data is being transferred to the application buffer. Calculating the CRC-32C digest is difficult when payload for a protocol data unit associated with each transport layer segment is transferred as soon as the transport layer segment arrives. Also, in certain embodiments, the cyclic redundancy check digest may be calculated at a granularity of 4-bytes, however, transport layer segments may be at any byte granularity. Embodiments perform the cyclic redundancy check in a manner that is efficient on storage usage as well as performance.

Figure 11:
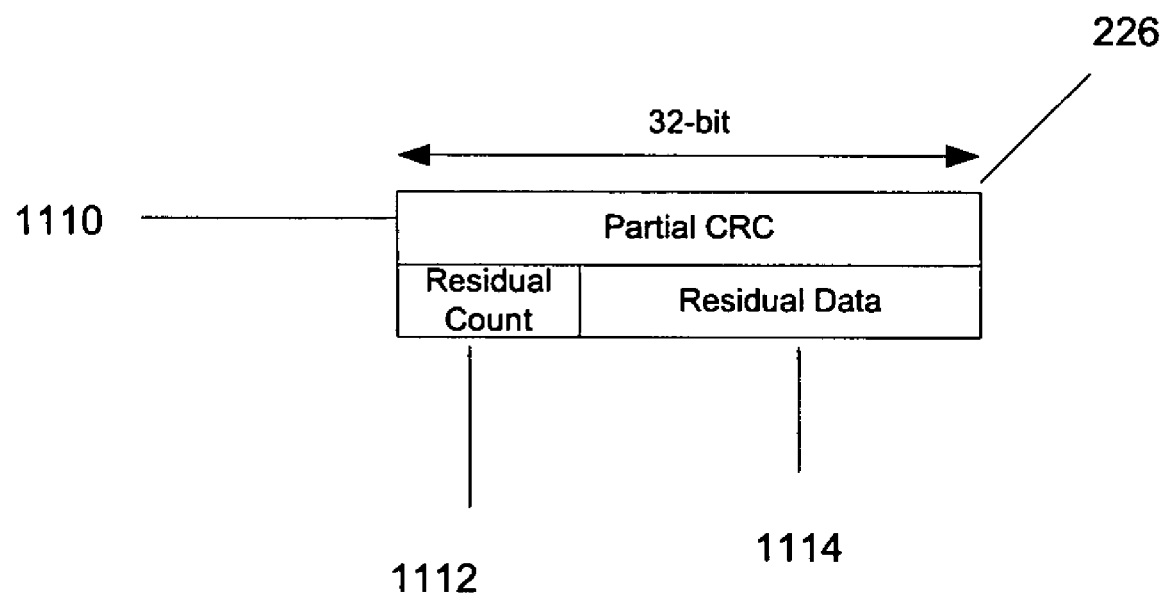
FIG. 11 illustrates a format of a Cyclic Redundancy Check (CRC) data structure in accordance with certain embodiments.

On each TCP connection, a CRC data structure 226 is maintained to calculate a cyclic redundancy check digest across a transport layer segment. FIG. 11 illustrates a format of a CRC data structure 226 in accordance with certain embodiments. The CRC data structure 226 includes a partial CRC digest field 1110, a residual count 1112, and residual data 1114. The partial CRC digest field 1110 maintains a cyclic redundancy check (e.g., CRC-32C) digest calculated for a certain number (e.g., [floor(N/4)×4], where N is the number of bytes over which the CRC is calculated) bytes of the preceding transport layer segment. The residual data field 1112 maintains the remnant bytes from the preceding transport layer segment. In certain embodiments, the number of residual data bytes={N−[floor (N/4)×4]} (where N is the number of bytes over which the CRC is calculated). The residual count field 1114 maintains a number of bytes that are valid in the residual data field.

With every new transport layer segment, the CRC engine 224 is provided with the partial CRC digest from the preceding transport layer segment, which it uses as an initial CRC. The "residual data" is also provided to calculate the subsequent CRC digest. Once a protocol data unit is transferred, the final CRC digest is compared with the digest received. If a match is found, an application program 122 is notified of the received data (e.g., with a flag set by the CRC engine 224 to notify the pre-processing agent 210), otherwise an error is detected. In certain embodiments, when an error is detected, a network driver 126 is notified of the error.

Figure 12:
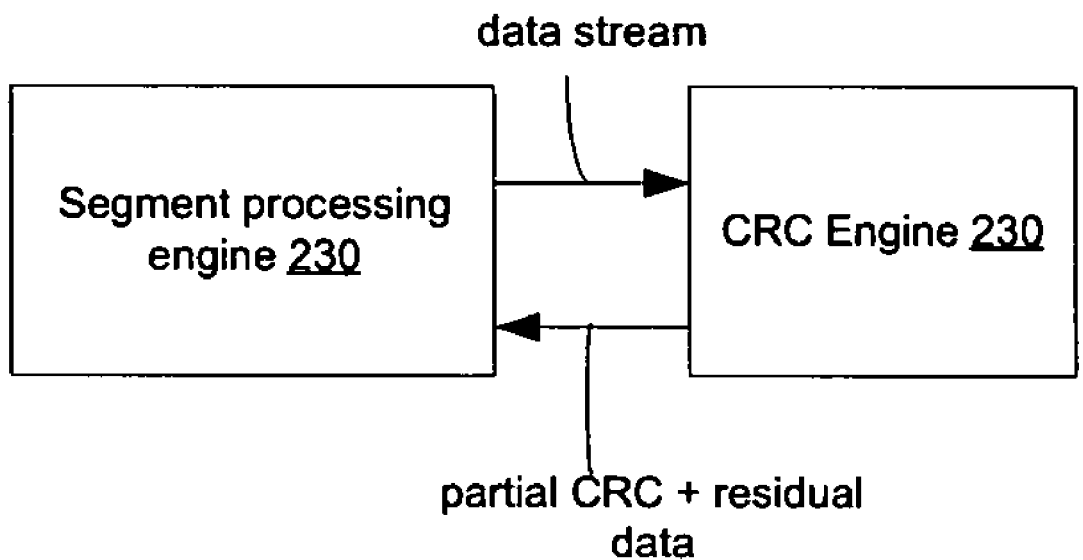
FIG. 12 illustrates an interaction of a segment processing engine and the Cyclic Redundancy Check (CRC) engine in accordance with certain embodiments.

FIG. 12 illustrates an interaction of a segment processing engine 230 and the CRC engine 224 in accordance with certain embodiments. The segment processing engine 230 is responsible for pushing the next transport layer segment to the CRC engine 224 for CRC digest calculation. With every new transport layer segment, the segment processing engine 230 provides the partial CRC digest from the previous transport layer segment along with the next transport layer segment. This partial CRC digest is used as an initial CRC digest for the next transport layer segment. Thus, this process serializes back-to-back transport layer segment processing on the same flow.

Figure 13:
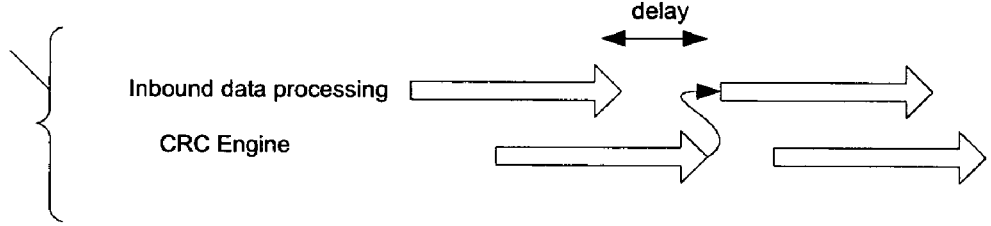
FIG. 13 illustrates a timeline of serialization in a "BEFORE" scenario in accordance with certain embodiments.
Figure 14:
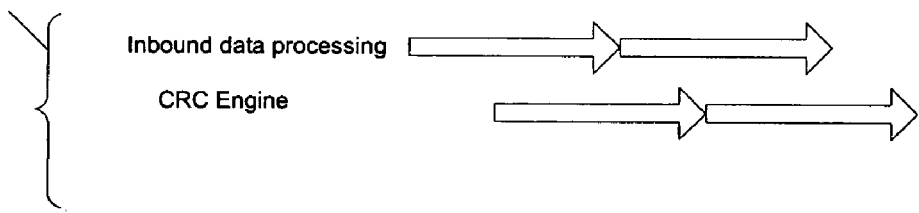
FIG. 14 illustrates a timeline of serialization in an "AFTER" scenario in accordance with certain embodiments.

FIG. 13 illustrates a timeline 1300 of serialization in a "BEFORE" scenario in accordance with certain embodiments. Since network traffic has been shown to come in bursts, the serialization illustrated by timeline 1300 may impact performance. Embodiments address this by introducing a "one-behind" storage area 228 (e.g., a cache) for the CRC data structure 226 inside of the CRC engine 224. The storage area 228 stores a partial CRC digest. The segment processing engine 230 determines whether a current transport layer segment is on the same flow as the last one, and, if so, the segment processing engine 230 starts transferring data to the CRC engine 224 without waiting for the partial CRC digest and residual data exchange. The CRC engine 224 is also cognizant of such a situation and uses the cached version of the partial CRC digest. FIG. 14 illustrates a timeline 1400 of serialization in an "AFTER" scenario in accordance with certain embodiments. In FIG. 14, the timeline 1400 shows that the "delay" in the BEFORE scenario of FIG. 13 disappears in the "AFTER" case.

Figure 15:
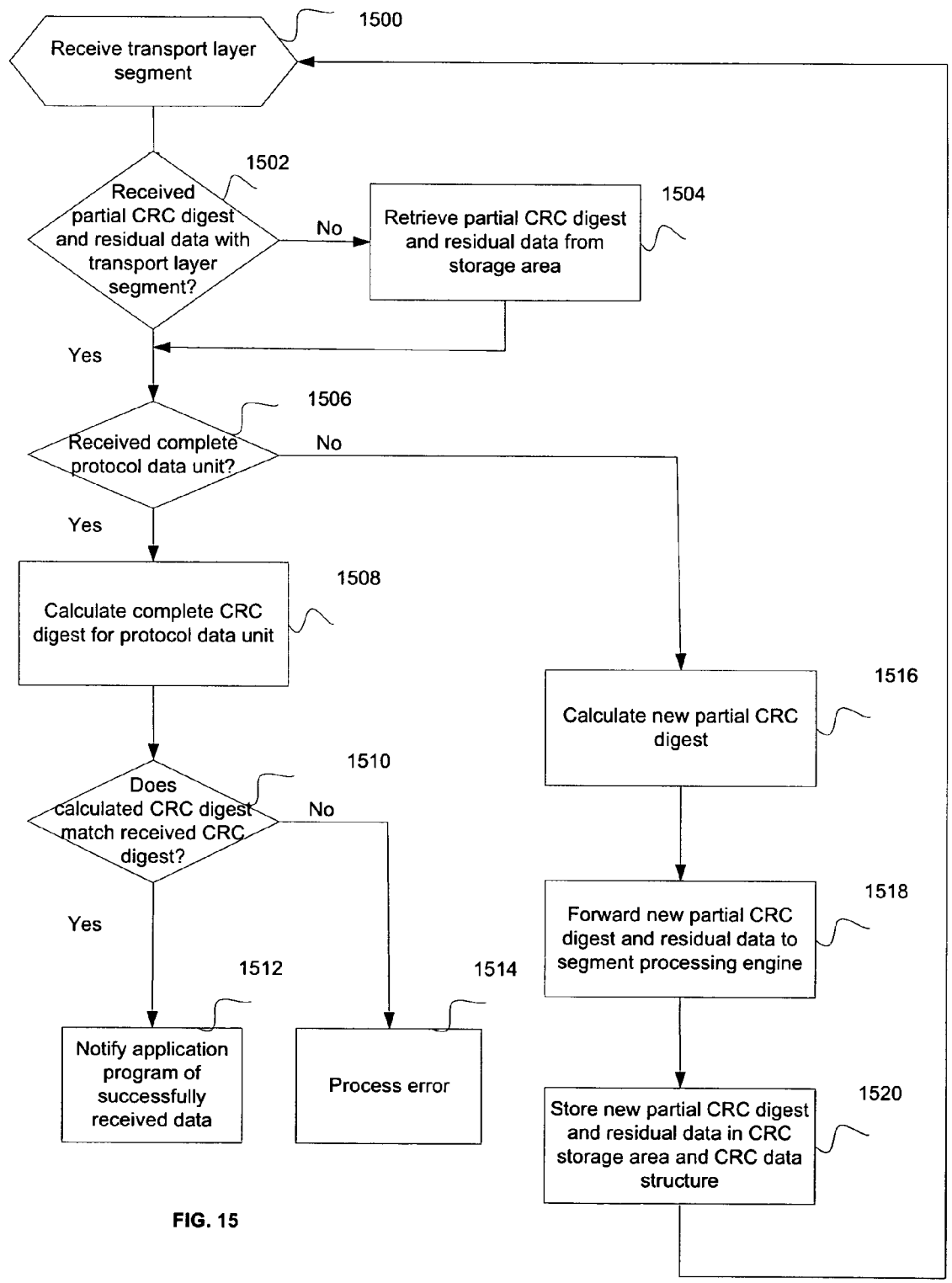
FIG. 15 illustrates operations performed by a Cyclic Redundancy Check (CRC) engine in accordance with certain embodiments.

FIG. 15 illustrates operations performed by the CRC engine 224 in accordance with certain embodiments. Control begins at block 1500 with the CRC engine 224 receiving a transport layer segment. In block 1502, the CRC engine 224 determines whether a partial CRC digest and residual data were received with the transport layer segment. If so, processing continues to block 1506, otherwise, processing continues to block 1504. In block 1504, the CRC engine 224 retrieves a partial CRC digest and residual data for a previous transport layer segment from a CRC storage area 228.

In block 1506, the CRC engine 224 determines whether a complete protocol data unit has been received with the receipt of this transport layer segment. That is, since a protocol data unit may have multiple protocol segments embedded within multiple transport layer segments, the CRC engine 224 determines whether it now has received a complete protocol data unit. If so, processing continues to block 1508, otherwise, processing continues to block 1516.

In block 1508, the CRC engine 224 calculates a complete CRC digest for the protocol data unit using the received or retrieved partial CRC digest and residual data. For example, a state machine and associated registers may be used to calculate the complete CRC digest, and the partial CRC digest and residual data may be used to save the state of the registers before all data for the protocol data unit is received. In block 1510, the CRC engine 224 determines whether the calculated CRC digest matches a received CRC digest. If so, processing continues to block 1512, otherwise, processing continues to block 1514. In block 1512, the CRC engine 224 notifies an application program 122 of the successfully received data. In block 1514, the CRC engine 224 processes an error.

In block 1516, the CRC engine 224 calculates a new partial CRC digest using the received or retrieved partial CRC digest and residual data. In block 1518, the received or retrieved partial CRC digest and residual data forwards the new partial CRC digest and residual data to the segment processing engine 230. In block 1520, the received or retrieved partial CRC digest and residual data stores the new partial CRC digest and residual data in a CRC data structure 226 and in a CRC storage area 228. Then, processing loops back to block 1500.

Figure 16:
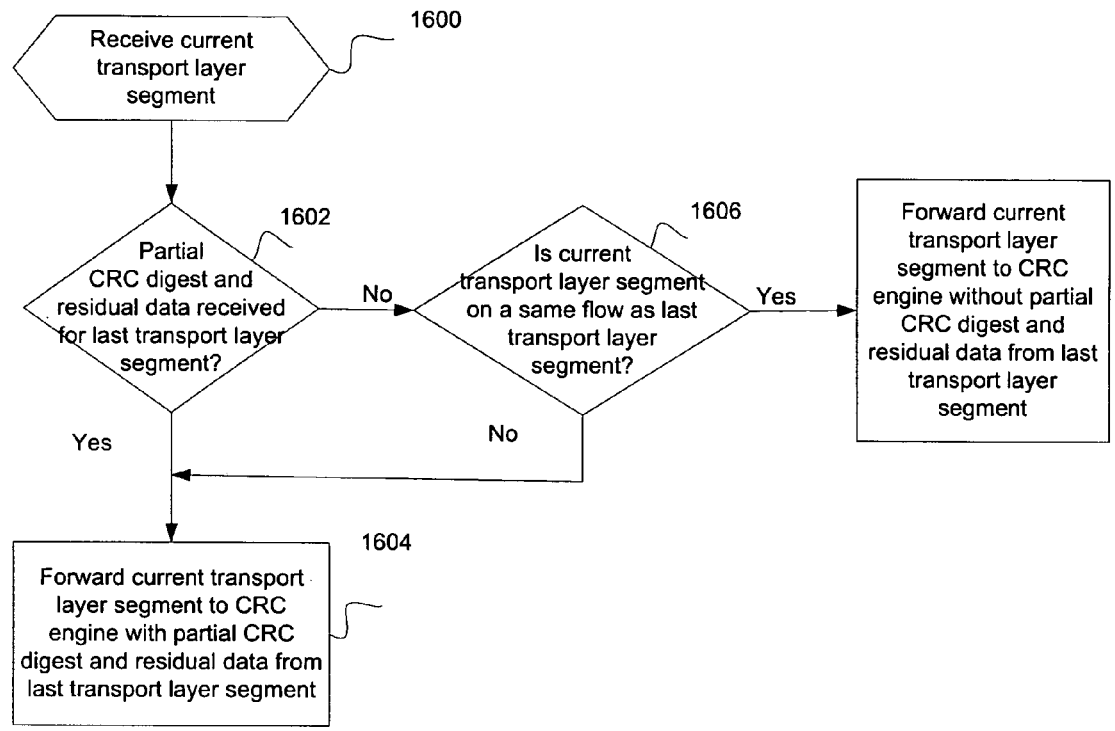
FIG. 16 illustrates operations performed by a segment processing engine for cyclic redundancy checking in accordance with certain embodiments.

FIG. 16 illustrates operations performed by the segment processing engine 230 for cyclic redundancy checking in accordance with certain embodiments. Control begins at block 1600 with the segment processing engine 230 receiving a current transport layer segment. In block 1602, the segment processing engine 230 determines whether a partial CRC digest and residual data were received for a last transport layer segment. If so, processing continues to block 1604, otherwise, processing continues to block 1606. In block 1604, the segment processing engine 230 forwards the current transport layer segment to the CRC engine 224 with the partial CRC digest and the residual data for the last transport layer segment.

In block 1606, the segment processing engine 230 determines whether the current transport layer segment is on a same flow as the last transport layer segment. The current transport layer segment may be determined to be on the same flow as the last transport layer segment if both have the same TCP connection and are received in correct order. If so, processing continues to block 1608, otherwise, processing loops back to block 1604. In block 1608, the segment processing engine 230 forwards the current transport layer segment to the CRC engine 224 without the partial CRC digest and the residual data for the last transport layer segment.

Thus, embodiments solve a practical problem for Layer 4+ protocol data unit reception and data placement. An effective and complete solution is provided for each critical stage for processing received transport layer segments whose data portions may contain protocol segments.

Embodiments provide a solution for Layer 4+ protocol data unit detection, marker validation and stripping, Layer 4+ direct header inspection using a pre-processing agent 210, and CRC calculation of protocol data unit payload that could span multiple byte aligned transport layer segments. Streamlined processing of receive traffic is provided for processing Layer 4+ traffic. Effective handling of receive traffic in turn improves overall system performance.

Thus, certain embodiments process receive protocol data units for upper layer protocols, such as iSCSI and RDMA.

Additional Embodiment Details

The described embodiments may be implemented as a method, apparatus or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on a motherboard.

The illustrated operations of FIGS. 6, 7, 8, 9, 15, and 16 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for processing a data segment, comprising:
stripping, with a computer including a network adapter and a central processing unit, a header from a transport layer segment;
performing protocol data unit detection to determine data for a protocol segment that is part of data of the transport layer segment by:
    extracting a value from an offset of a length field of a header of a protocol data unit for a width of the length field of the header;
    determining a final length of the protocol data unit based on the extracted value and values of an order of multiply/add parameter, a length field multiplier parameter, and a length field adder parameter; and
    detecting a protocol data unit based on a starting location and the final length of the protocol data unit; and
performing marker validation and stripping.

2. The method of claim 1, wherein performing marker validation and stripping further comprises:
extracting a marker length number of bytes from an initial offset;
validating the marker based on a marker type; and
jumping a marker interval in an incoming byte stream.

3. The method of claim 1, further comprising:
receiving a peek command requesting a header portion of a next protocol data unit;
waiting for the requested data; and returning the requested data in response to the peek command.

4. The method of claim 3, wherein returning the requested data further comprises:
providing a location of a header of the protocol data unit to a pre-processing agent.

5. The method of claim 3, wherein returning the requested data further comprises:
providing a header of the protocol data unit to a pre-processing agent.

6. An article of manufacture for processing a data segment, wherein the article of manufacture comprises a computer readable medium storing instructions, and wherein the instructions, when executed by a processor of a computer, are operable to:
strip a header from a transport layer segment;
perform protocol data unit detection to determine data for a protocol segment that is part of data of the transport layer segment by:
extracting a value from an offset of a length field of a header of a protocol data unit for a width of the length field of the header;
determining a final length of the protocol data unit based on the extracted value and values of an order of multiply/add parameter, a length field multiplier parameter, and a length field adder parameter; and
detecting a protocol data unit based on a starting location and the final length of the protocol data unit; and
perform marker validation and stripping.

7. The article of manufacture of claim 6, wherein when performing marker validation and stripping, the instructions, when executed by the processor of the computer, are operable to:
extract a marker length number of bytes from an initial offset;
validate the marker based on a marker type; and
jump a marker interval in an incoming byte stream.

8. The article of manufacture of claim 6, wherein the instructions, when executed by the processor of the computer, are operable to:
receive a peek command requesting a header portion of a next protocol data unit;
wait for the requested data; and
return the requested data in response to the peek command.

9. The article of manufacture of claim 8, wherein when returning the requested data, the instructions, when executed by the processor of the computer, are operable to:
provide a location of a header of the protocol data unit to a pre-processing agent.

10. The article of manufacture of claim 8, wherein when returning the requested data, the instructions, when executed by the processor of the computer, are operable to:
provide a header of the protocol data unit to a pre-processing agent.

11. A system for processing a data segment, comprising:
a network adapter coupled to a Peripheral Component Interconnect (PCI) bus; and
hardware logic at the network adapter operable to:
strip a header from a transport layer segment;
perform protocol data unit detection to determine data for a protocol segment that is part of data of the transport layer segment by:
extracting a value from an offset of a length field of a header of a protocol data unit for a width of the length field of the header;
determining a final length of the protocol data unit based on the extracted value and values of an order of multiply/add parameter, a length field multiplier parameter, and a length field adder parameter; and
detecting a protocol data unit based on a starting location and the final length of the protocol data unit; and
perform marker validation and stripping.

12. The system of claim 11, wherein when performing marker validation and stripping, the hardware logic is operable to:
extract a marker length number of bytes from an initial offset;
validate the marker based on a marker type; and
jump a marker interval in an incoming byte stream.

13. The system of claim 11, wherein the hardware logic is operable to:
receive a peek command requesting a header portion of a next protocol data unit;
wait for the requested data; and
return the requested data in response to the peek command.

14. The system of claim 13, wherein when returning the requested data, the hardware logic is operable to:
provide a location of a header of the protocol data unit to a pre-processing agent.

15. The system of claim 13, wherein when returning the requested data, the hardware logic is operable to:
provide a header of the protocol data unit to a pre-processing agent.

* * * * *